United States Patent
Hiwatashi et al.

[11] Patent Number: 5,762,380
[45] Date of Patent: Jun. 9, 1998

[54] PIPE JOINT WITH FLANGED HOUSINGS

[75] Inventors: Shoichi Hiwatashi; Takashi Tozaki; Toshio Funato, all of Yawara-mura, Japan

[73] Assignee: SMC Corporation, Tokyo, Japan

[21] Appl. No.: 779,237

[22] Filed: Jan. 3, 1997

[30] Foreign Application Priority Data

Jan. 19, 1996 [JP] Japan ................. 8-026028

[51] Int. Cl.$^6$ ............... F16L 37/00; F16L 21/08
[52] U.S. Cl. ............... 285/39; 285/371; 285/383; 285/61; 285/322
[58] Field of Search ............... 285/322, 323, 285/39, 61, 64, 369, 371, 383

[56] References Cited

U.S. PATENT DOCUMENTS

| | | | |
|---|---|---|---|
| 2,122,925 | 7/1938 | Bins | 285/64 |
| 3,612,583 | 10/1971 | Anderson. | |
| 3,645,567 | 2/1972 | Reinker, Jr.. | |
| 4,610,470 | 9/1986 | Perrine et al. | 285/383 |
| 4,621,839 | 11/1986 | Duell et al. | 285/61 |
| 4,657,286 | 4/1987 | Guest | 285/323 |
| 4,796,924 | 1/1989 | Kosugi et al. | 285/39 |
| 4,810,009 | 3/1989 | Legris | 285/39 |
| 4,895,395 | 1/1990 | Ceriani | 285/39 |
| 4,946,213 | 8/1990 | Guest | 285/323 |
| 5,332,269 | 7/1994 | Homm | 285/39 |

FOREIGN PATENT DOCUMENTS

| | | |
|---|---|---|
| 0 379 655 | 8/1990 | European Pat. Off.. |
| 377 349 | 7/1932 | United Kingdom. |
| 2155576 | 9/1985 | United Kingdom ................. 285/39 |

*Primary Examiner*—Eric K. Nicholson
*Attorney, Agent, or Firm*—Oblon, Spivak, McClelland, Maier & Neustadt, P.C.

[57] ABSTRACT

A pipe joint comprises two tube-end connectors 4, 4 to which the end of a tube 3 is connected, a cylindrical spacer 1 with the tube-end connector 4 fitted to either end, and a pair of metallic housings 6, 6 that each axially covers half the side outer circumference of the spacer 1 and each tube end connector 4, 4.

3 Claims, 2 Drawing Sheets

5,762,380

1

PIPE JOINT WITH FLANGED HOUSINGS

BACKGROUND OF THE INVENTION

1. Field of the Invention

The present invention relates to a pipe joint for linking the ends of flexible tubes together.

2. Prior Art

Conventional pipe joints for connecting the ends of flexible tubes together to feed through a pressure fluid including the following at either end of a synthetic resin body that acts as a strength member, a tube end connector (a quick joint) that enables the locking claws of a chuck to engage the ouer circumferential surface of the tube when the end of the tube are inserted and which enables the locking claws to be released when a release bush is pressed in order to allow the tube to be removed.

Pipe joints of this kind, however, are generally adapted for indoor use, if they are used outdoors or in a place where they must be weatherproof over a long time, the synthetic resin constituting the body is degraded to reduce its service life. Thus, action should be taken to provide such pipe joints with a longer service life expectancy, i.e., higher durability. Of course, this problem can be solved by providing the pipe joints with a metallic body, but if metal is used to make a body with a complicated shape, as can be done with a synthetic resin, the costs will increase accordingly.

DISCLOSURE OF THE INVENTION

The technical object of this invention is to provide a pipe joint in which the outer-circumferential surface member of the body, which acts as a strength member, is composed of metal in order to increase its life expectancy but without increasing manufacturing costs.

It is another technical object of this invention to provide a pipe joint that can be manufactured by a mass production means (such as metal press working) and to which a mounting member can be easily attached during the formation of the body.

To solve the above problems, this invention provides a pipe joint comprising two tube end connectors into which the end of a tube is inserted for connection, a cylindrical spacer with the tube-end connector fitted to either end, and a pair of metallic housing, each of which axially covers half the side outer circumference of the spacer and each tube-end connector.

Each of the tube-end connectors comprises at least a chuck with a plurality of locking claws that lock the outer surface of the inserted tube, and a release bush that causes the locking claws to be extended and opened to release the locking between the claws and the tube.

The housings each have at their opposing ends a flange that joins the other around the spacer, are linked together by coupling the flanges together, and keep both the tube-end connector and the spacer coupled together.

According to the preferred embodiment of this invention, the flanges provided in the pair of metallic housings are also used as mounting members for attaching the pipe joint to another member.

In the pipe joint of the above configuration, when the end of the tube is inserted into the tube-end connector, the locking claws of the chuck lock the outer circumference of the tube to keep it mounted. By attaching the end of each tube to the pair of tube-end connectors, the tubes are connected together. To remove the tube from the tube-end

2 connector, the release bush may be pressed to extend the locking claws, and the tube may then be removed.

In addition, in manufacturing this pipe joint, it is assembled by coupling together the flanges of the pair of the metallic housings that maintain both tube-end connectors fitted in the spacer. This assembly causes the outer circumference of the body to be covered with a metallic housing that acts as a strength member, so the pipe joint is weatherproof enough to provide for outdoor use as well as a long life expectancy. Furthermore, since the housings can be manufactured and the flanges can be joined together by a mass production means such as metal press working, the pipe joint is inexpensive to produce.

By simply enlarging the flanges for coupling the pair of housings together, the mounting member for the pipe joint can be installed simultaneously with the formation of the body.

DETAILED DESCRIPTION OF THE INVENTION

Figure 1:
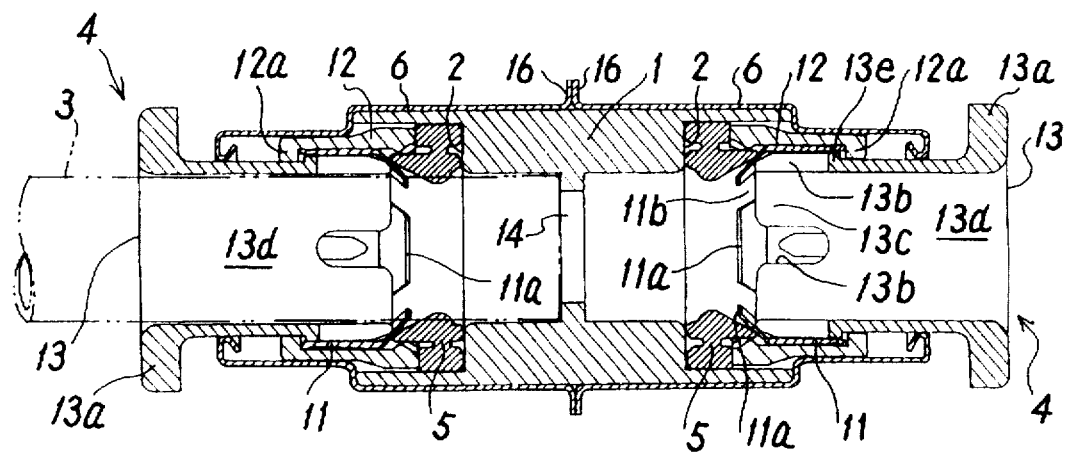
FIG. 1 is a vertical cross-sectional view showing the constitution of a first embodiment of a pipe according to this invention.
Figure 2:
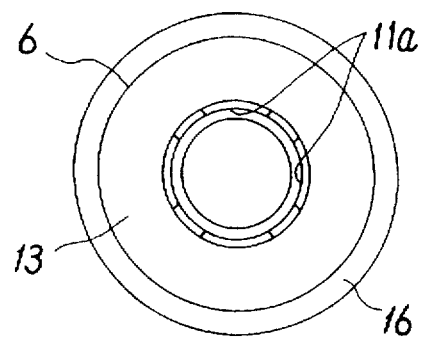
FIG. 2 is a front view of FIG. 1.

FIGS. 1 and 2 show a first embodiment of a pipe joint according to this invention.

The pipe joint comprises a cylindrical spacer 1 formed of a synthetic resin, and a tube-end connector 4 into which the end of a flexible tube 3 is inserted for connection is fitted via a seal member 5 in either end of the spacer 1 in its enlarged diameter stage portion 2 formed in its inner circumference. A lateral pair of metallic housings 6, 6 each axially cover half the side outer circumference of the spacer 1 and the tube-end connectors 4, 4, and the housings 6, 6 are joined together approximately in the middle of the spacer 1 to keep the spacer 1 and each of the tube-end connectors 4, 4 coupled together.

The pair of tube-end connectors 4 have the same configuration, and each comprises a metallic chuck 11 on which a plurality of locking claws 11a that lock the outer surface of the inserted tube 3 are provided; a collet 12 disposed outside the chuck 11 for holding it; and a release bush 13 that is held in such a way that its tip is inserted into the chuck 11 and which releases locking claws 11a and the tube 3 when the chuck is pressed to extend and open the locking claws 11a.

More specifically, the chuck 11 is formed by providing a plurality of slits 11b in a cylindrical metallic member and forming the plurality of locking claws 11a, the tips of which are bent inward (toward the tube) so that the slits 11b apply radial elasticity to the locking claws 11a. The locking claws 11a cut into the outer circumferential surface of the tube 3 to hold it. The collet 12 is cylindrical so as to externally hold the chuck 11, and includes at its outer end an inwardly facing flange 12a that locks the end of the chuck 11 that is opposed to the locking claws 11a in order to prevent the chuck 11 from being removed if force is applied to the tube 3 in the direction in which the tube is pulled out. In addition, radial elasticity is applied to the inner end of the collet 12 by providing slits (not shown) similar to those in the chuck 11.

The release bush 13 the tip of which is inserted and held in the chuck 11 comprises a pressure head section 13a that protrudes externally from the housing 6, a press-in leg section 13c to which radial elasticity is applied through an axial slit 13b, and a throughhole 13d into which the tube 3 is inserted. The release bush 13 is held so as not to be removed from the collet 12 by allowing the tip of the press-in leg section 13c to contact the inside of the locking claws 11a of the chuck 11 to engage a circumferential protrusion section 13e with an inwardly facing flange 12a of the collet 12.

The seal member 5 between the tube-end connector 4 and the enlarged diameter stage section of the spacer 1 seals the outer circumference of the tube 3 which is inserted until it touches an inner circumferential stopper 14 of the spacer 1 through the throughhole 13d of the release bush 13, thereby keeping the tubes connected to both tube-end connectors sealed.

The metallic housing 6 is fitted around each tube-end connector 4 fitted at either end of the spacer 1, and only the pressure-head section 13a of the release bush 13 protrudes from the housing 6. The flanges 16 provided in the pair of metallic housings 6 are joined together in the spacer 1 and around it, and the flanges 16 are coupled together to link the pair of metallic housings 6 together in order to cover the spacer 1 and the tube-end connector 4 at either end thereof with the metallic housings, with both tube-end connectors 4 kept fitted in and coupled to the spacer 1.

The above pipe joint is assembled by coupling together the flanges 16 of the pair of metallic housings 6 that keep both tube-end connectors fitted in the spacer 1. This assembly causes the outer circumference of the pipe joint to be covered with the metallic housing 6 that acts as a strength member, so the pipe joint is sufficiently weatherproof to provide for outdoor use and also has a long life expectancy.

The coupling structure of the flange 16 of the cylindrical metallic housing 6 enables manufacturing via a mass production means such as metal press working. The flanges 16 can be coupled together by a simple means such as welding, adhesion, or the folding of the periphery of one of the flanges against the outside of the other so as to grip it, thereby ensuring sufficient strength and low production costs.

The tube-end connectors 4 are not limited to the above configuration. Instead, various joint structures commonly known as "quick joints" can be used which comprise a chuck 11 including a plurality of locking claws 11a that lock the outer surface of the inserted tube 3 and a release bush 13 that extends the locking claws 11a and releases the locking between the claws 11a and the tube 3.

In the pipe joint of the above configuration, when the end of the tube is inserted into the tube-end connector 4 through the release bush 13, the locking claws 11a of the chuck 11 are extended and cut into the outer circumferential surface of the tube 3 to lock it, thereby maintaining the tube 3 attached to the tube end connector 4 and sealing the outer circumference of the tube 3 with the seal member 5. By attaching the end of each tube to the pair of tube-end connectors 4, the tubes are connected together.

After the tube 3 has been connected to the tube-end connector 4 and when force is effected in the direction in which the tube 3 is pulled out, the chuck 11 and the collet 12 are slightly withdrawn due to the locking force of the edge-like locking claws 11a on the tube 3; however, the force effected to pull the tube 3 causes the locking claws 11a to further cut into the outer circumferential surface of the tube 3, thereby preventing the tube 3 from being removed from the pipe joint.

To remove the tube 3 from the tube-end connector 4, the pressure-head section 13a is used to press the release bush 13 to extend the locking claws 11a in order to stop the claws from locking the tube 3, thereby allowing the tube 3 to be removed.

Figure 3:
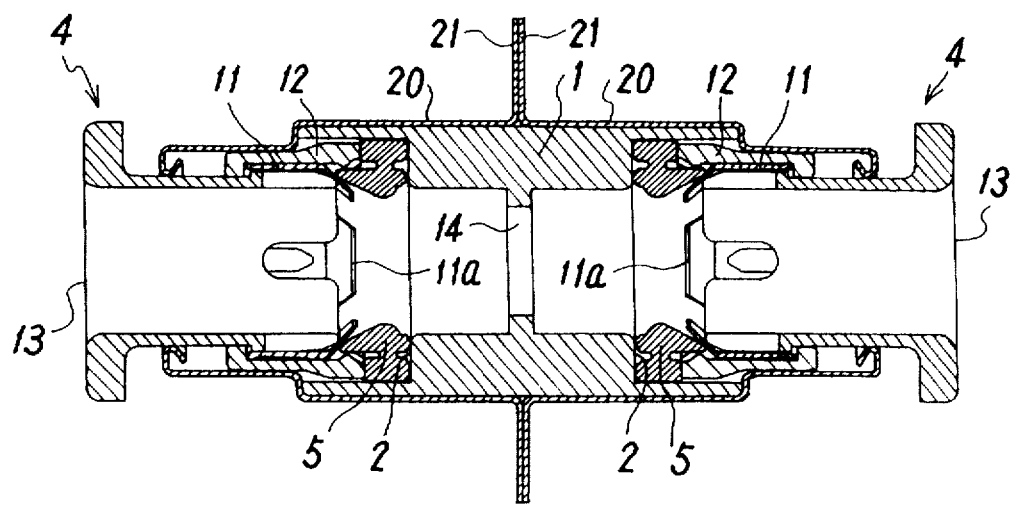
FIG. 3 is a vertical cross-sectional view showing the constitution of a second embodiment of the pipe according to this invention.
Figure 4:
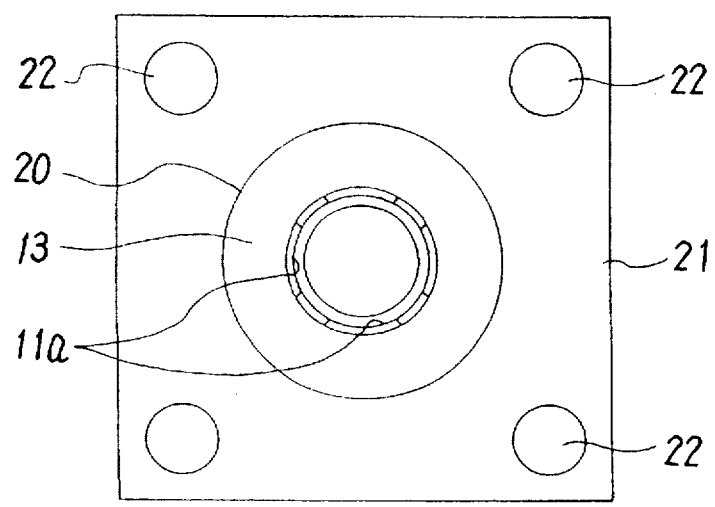
FIG. 4 is a front view of FIG. 3.

A second embodiment of this invention shown in FIGS. 3 and 4 has a basic configuration similar to that of the first embodiment, wherein the tube-end connector 4 is fitted in either end of a spacer 1 formed of a synthetic resin and wherein the spacer 1 and the pair of tube-end connectors 4 at either end thereof are covered with a pair of metallic housings 20 joined together in the middle and coupled together by these housings 20. This embodiment, however, is different from the first embodiment in that the flange 21 provided in the housing 20 is large and has a mounting hole 22, and in that the flange 21 can be used to couple the housings 20 together and as a mounting member for the pipe joint to attach it to a wall.

Figure 5:
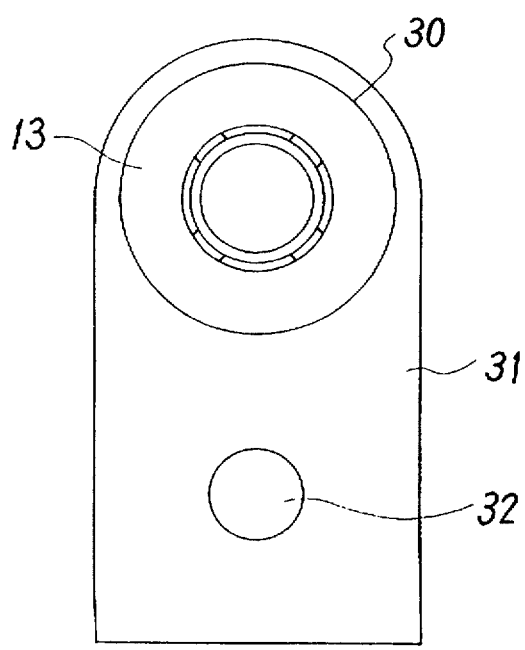
FIG. 5 is a front view showing the constitution of a flange in a third embodiment of the pipe according to this invention.

FIG. 5 shows a third embodiment of this invention, wherein a metallic housing 30 which has a flange 31 shaped differently from the second embodiment and extending to one side is mounted. Reference numeral 32 designates a mounting hole.

Of course, the shape of this flange can be arbitrarily formed depending on the mounting target.

As described above, the housings 20 and 30 can also be used, by simply enlarging the flanges 21 and 31 for coupling those housings together, as mounting members for the pipe joint and installed simultaneously with the formation of the body of the pipe joint.

The remaining part of the configuration and the effects of the second and third embodiments are the same as in the first embodiment.

Although the pipe joint according to this invention is used to connect tubes for feeding a pressure fluid, it can also be used to connect tubes used for other purposes.

In the illustrated embodiments, the spacer is laterally and symmetrically formed in the axial direction, and the pair of tube-end connectors and the pair of housings each have the same configuration. The whole pipe joint, accordingly, forms lateral symmetry in the axial direction. Needless to say, however, laterally asymmetrical pipe joints can also be formed.

As described above in detail, this invention can provide a pipe joint in which the outer-circumferential surface member of the body that acts as a strength member is composed of metal to increase its life expectancy and provide for low manufacturing costs.

This invention can also provide a pipe joint that can be manufactured by a mass production means such as metal press working and to which a mounting member can be easily attached during the formation of the body.

What is claimed:

1. A pipe joint comprising two tube-end connectors into each of which the end of a tube is inserted for connection, a cylindrical spacer having ends into each of which one of the tube-end connector is fitted, and a pair of metallic housings that each axially covers half the side outer circumference of the spacer and one of the tube-end connectors, wherein:

each of said tube end connectors comprises at least a chuck with a plurality of locking claws that lock the outer surface of the inserted tube; and a release bush that extends the locking claws and releases the claws and the tube, and wherein:

said housings each have at their opposing ends a flange that joins the other flange around the spacer, said housings being linked together by coupling the flanges together, and said housings keeping both the tube-end connectors and the spacer coupled together.

2. A pipe according to claim 1 wherein said flange is also used as a mounting member for attaching the pipe joint to another member.

3. A pipe according to claim 1 or claim 2 having a configuration that is laterally symmetrical in the axial direction, wherein said spacer is laterally and symmetrically formed in the axial direction and wherein the pair of tube-end connectors and the pair of housings each have the same configuration.

* * * * *